United States Patent
Kim et al.

(10) Patent No.: US 11,848,626 B2
(45) Date of Patent: Dec. 19, 2023

(54) BODY ATTACHABLE TRIBOELECTRIC GENERATING DEVICE AND MANUFACTURING METHOD THEREOF

(71) Applicant: Industry-Academic Cooperation Foundation, Chosun University, Gwangju (KR)

(72) Inventors: Youn Tae Kim, Daejeon (KR); Da Eun Kim, Gwangju (KR); Chang Jun Lee, Gwangju (KR)

(73) Assignee: Industry-Academic Cooperation Foundation, Chosun University, Gwangju (KR)

(*) Notice: Subject to any disclaimer, the term of this patent is extended or adjusted under 35 U.S.C. 154(b) by 0 days.

(21) Appl. No.: 17/534,044

(22) Filed: Nov. 23, 2021

(65) Prior Publication Data

US 2023/0099318 A1 Mar. 30, 2023

(30) Foreign Application Priority Data

Sep. 28, 2021 (KR) .................. 10-2021-0127983

(51) Int. Cl.
*H02N 1/04* (2006.01)
(52) U.S. Cl.
CPC .................................... *H02N 1/04* (2013.01)
(58) Field of Classification Search
CPC ........................................................ H02N 1/04
USPC ................................................. 310/309, 310
See application file for complete search history.

(56) References Cited

U.S. PATENT DOCUMENTS

| | | | | |
|---|---|---|---|---|
| 8,505,474 | B2* | 8/2013 | Kang | H05K 1/038 |
| | | | | 57/244 |
| 2013/0049531 | A1 | 2/2013 | Wang et al. | |
| 2017/0317609 | A1* | 11/2017 | Kim | H02N 1/04 |
| 2020/0037876 | A1* | 2/2020 | Kim | A61B 5/681 |
| 2023/0094068 | A1* | 3/2023 | Yu | H02N 1/04 |
| | | | | 310/310 |
| 2023/0099318 | A1* | 3/2023 | Kim | H02N 1/04 |
| | | | | 310/310 |

FOREIGN PATENT DOCUMENTS

| | | | |
|---|---|---|---|
| KR | 10-2020-0055537 A | | 5/2020 |
| WO | WO 2014206098 | * | 12/2014 |
| WO | WO 2015024369 | * | 2/2015 |
| WO | WO 2021095947 | * | 5/2021 |

OTHER PUBLICATIONS

An epidermal sEMG tattoo-like patch as a new human-machine interface for patients with loss of voice (Year: 2020).*

(Continued)

*Primary Examiner* — Ahmed Elnakib
(74) *Attorney, Agent, or Firm* — Renner, Otto, Boisselle & Sklar, LLP

(57) ABSTRACT

A body-attachable triboelectric generating device includes a negatively electrified body including an upper electrified layer and a lower electrified layer adhered to the upper electrified layer; and an electrode layer provided between the upper electrified layer and the lower electrified layer. An engraved pattern, serving as a spacer, is formed on one surface of each of the upper and lower electrified layer in contact with the electrode layer.

8 Claims, 6 Drawing Sheets

(56) References Cited

OTHER PUBLICATIONS

Qiu Jiang et al., 'MXene electrochemical microsupercapacitor integrated with triboelectric nanogenerator as a wearable self-charging power unit', in Nano Energy Aug. 3, 2018 p. 266-272.
Xiaoning Cui et al., 'Pulse sensor based on single-electrode triboelectric nanogenerator', in Sensors and Actuators A : Physical Aug. 1, 2018 p. 326-331.
Po-Kang Yang et al., 'A Flexible, Stretchable and Shape-Adaptive Approach for Versatile Energy Conversion and Self-Powered Biomedical Monitoring', in Advanced Materials May 15, 2015.
Office Action issued by the Korean Intellectual Property Office (KIPO) dated May 9, 2023, corresponding to counterpart Korean patent application No. KR10-2021-0127983.

* cited by examiner

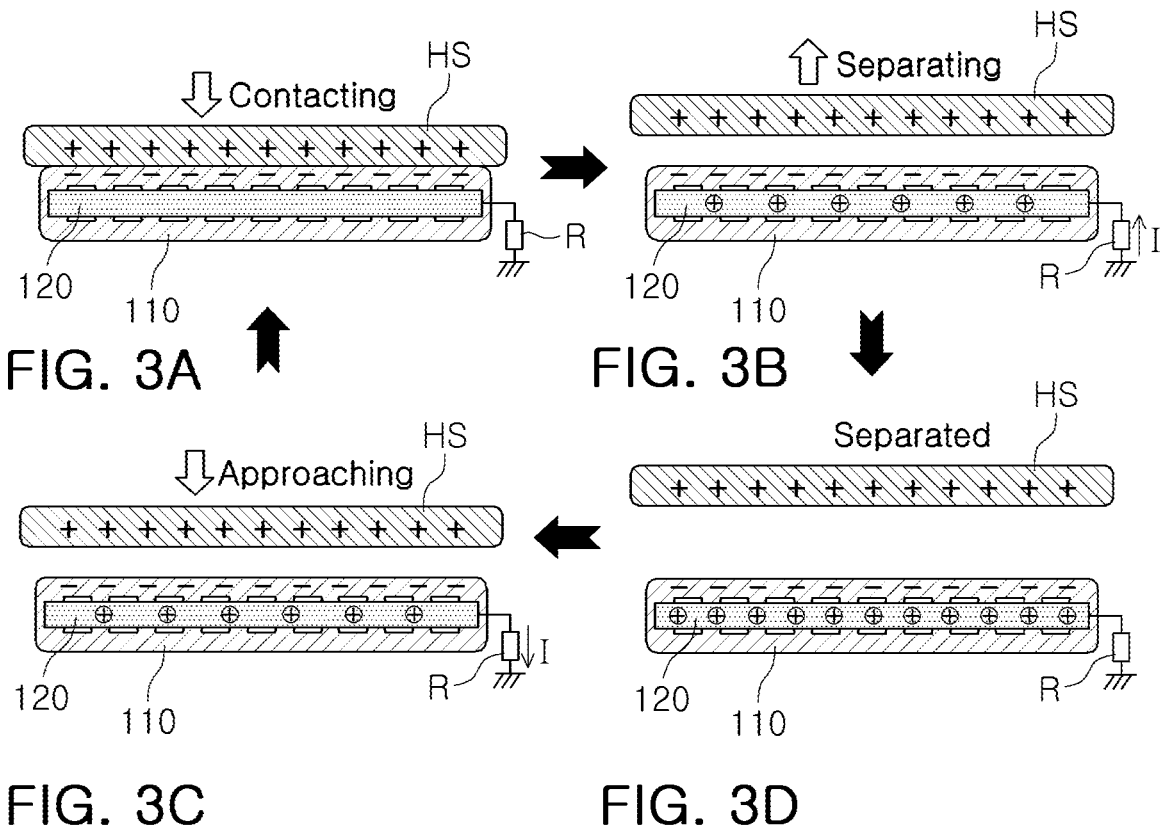

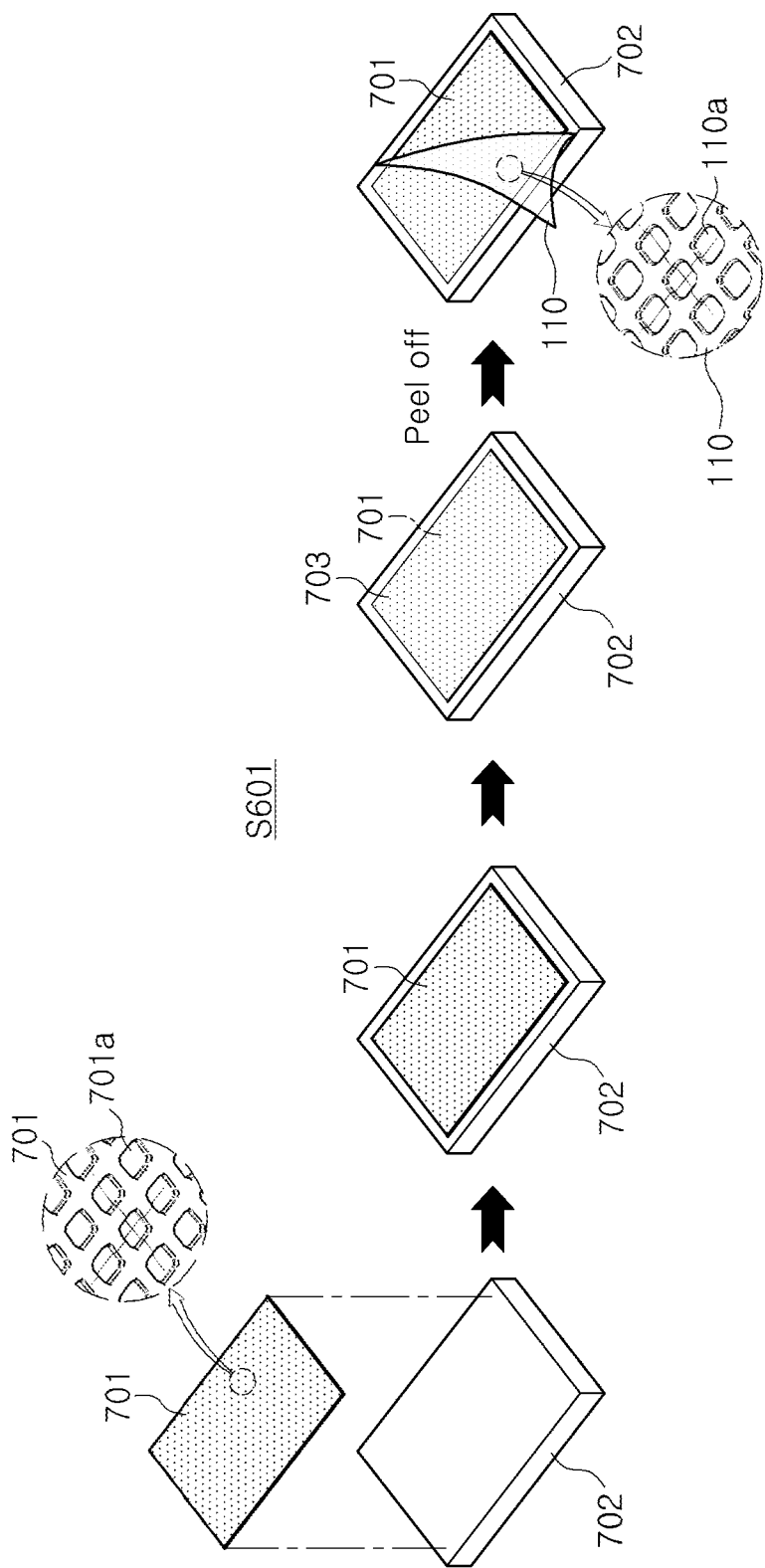

BODY ATTACHABLE TRIBOELECTRIC GENERATING DEVICE AND MANUFACTURING METHOD THEREOF

CROSS-REFERENCE TO RELATED APPLICATION(S)

The present application claims the benefit of priority to Korean Patent Application No. 10-2021-0127983, filed on Sep. 28, 2021 in the Korean Intellectual Property Office, the entire disclosure of which is incorporated herein by reference.

BACKGROUND

1. Field

The present disclosure relates to a body-attachable triboelectric generating device and method of manufacturing the same.

2. Description of Related Art

Recently, research into a technology, capable of sensing an external pressure or a biological signal using a wearable sensor such as an electronic skin (E-skin) sensor or a flexible strain sensor, has been conducted. Over the years, various capacitive and piezoelectric-based high-sensitivity flexible strain sensors, mimicking body tactile sensing functions, have been developed. However, an external power supply is required to operate such sensors. As an external power supply, an electrochemical battery such as a secondary battery has a limited lifespan and is required to be replaced and recharged. In addition, disposal of the electrochemical battery may cause environmental pollution.

To address the above issue, it is necessary to combine eco-friendly energy-harvesting technologies. In particular, a triboelectric energy-harvesting technology comes into the spotlight for a wide range of material selection, a simple mechanical structure, and characteristic of high flexibility. A triboelectric generating device is based on the principle that electric energy is generated by contact potential and electrostatic induction. Recently, body-attachable elastic triboelectric generating devices, capable of harvesting energy and sensing a pressure, have been developed.

To improve electrical output performance of such a triboelectric generating device, a contact surface of an electrified body may be micropatterned using an inexpensive and simple casting method. For example, silk and sandpaper may be used as a mold for casting an elastomer. However, such a mold may absorb an elastomeric solution to have difficulty in being peeled off or to be cured with surface powder.

In addition, a transparent and flexible triboelectric generating device using a hydrogel-based electrode has been developed in recent years. However, since conductive hydrogel is an aqueous electrolyte solution, the hydrogel may dehydrate with the lapse of time and may deteriorate mechanical flexibility and ionic conductivity. In most triboelectric generating devices, an additional metal should be connected to an electrode to connect an external load to each device. In such a case, an output of each device may be affected by different electric conductivity values of electrodes.

Therefore, a body-attachable triboelectric generating device requires flexibility and elasticity, an efficient micropatterning method of an electrified body, and a durable electrode which does not require additional connection to an electrode.

SUMMARY

An aspect of the present disclosure is to provide a body-attachable triboelectric generating device, which does not require an additional spacer and may be attached to a body to harvest stable energy and to sense a micropressure such as arterial pulse, and a method of manufacturing the same.

An aspect of the present disclosure is to provide a body-attachable triboelectric generating device, which may be strained and expanded and contracted, may be easily attached to a curved portion of a body due to thinness and flexibility of the device, and may achieve stable electrical output, and a method of manufacturing the same.

According to an aspect of the present disclosure, a body-attachable triboelectric generating device includes: a negatively electrified body including an upper electrified layer and a lower electrified layer adhered to the upper electrified layer; and an electrode layer provided between the upper electrified layer and the lower electrified layer. An engraved pattern, serving as a spacer, is formed on one surface of each of the upper and lower electrified layer in contact with the electrode layer.

The negatively electrified body may include an elastomer, and the elastomer may include polydimethylsiloxane (PDMS) or silicone rubber.

The electrode layer may include metal composite embroidery yarn, and the metal composite embroidery yarn may include at least one of gold, silver, copper, and stainless steel.

The electrode layer may form a predetermined pattern, and the predetermined pattern may include a zigzag pattern or a wrinkle pattern.

The body-attachable triboelectric generating device may generate triboelectricity by contact with a body acting as a positively electrified body.

According to another aspect of the present disclosure, a method of manufacturing a body-attachable triboelectric generating device includes: a first operation of forming an upper electrified layer and a lower electrified layer, respectively having surfaces on which engraved patterns serving as spacers are formed; a second operation of seating an electrode layer on the lower electrified layer, on which the engrave pattern is formed, to form a predetermined pattern; and a third operation of adhering the upper electrified layer to the lower electrified layer such that the surface of the upper electrified layer, on which the engraved pattern is formed, faces the electrode layer.

The first operation may include: attaching a casting mold, having an exposed surface on which an embossed pattern is formed, to one surface of a glass substrate; applying an elastomeric solution to the exposed surface of the casting mold;

curing the applied elastomeric solution to form an elastomer; and removing the cured elastomer from the casting mold to form the upper electrified layer or the lower electrified layer having one surface on which an engraved pattern, corresponding to the embossed pattern, is formed.

The casting mold may include a Teflon tape, and the predetermined pattern may include a zigzag pattern or a wrinkle pattern.

BRIEF DESCRIPTION OF DRAWINGS

The above and other aspects, features, and advantages of the present disclosure will be more clearly understood from the following detailed description, taken in conjunction with the accompanying drawings.

FIG. 3A, FIG. 3B, FIG. 3C and FIG. 3D are a diagram illustrating a triboelectric generating principle of a body-attachable triboelectric generating device according to an example embodiment of the present disclosure.

FIG. 7A, FIG. 7B, FIG. 7C and FIG. 7D are a diagram materializing operation 5601 illustrated in FIG. 6.

DETAILED DESCRIPTION

Figure 1:
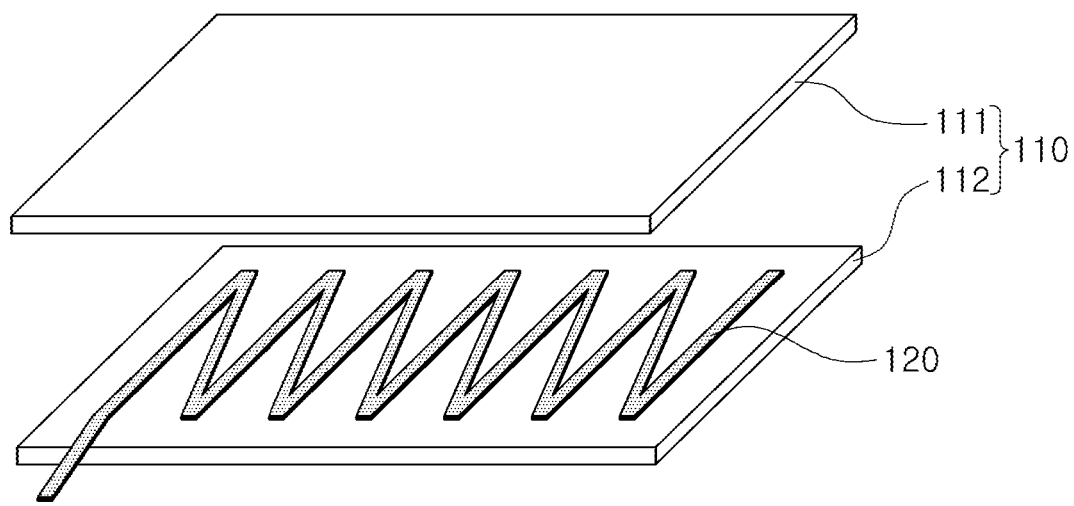
FIG. 1 is an exploded perspective view of a body-attachable triboelectric generating device according to an example embodiment of the present disclosure.

Hereinafter, example embodiments of the present disclosure will be described in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is an exploded perspective view of a body-attachable triboelectric generating device according to an example embodiment, and FIG. 2 is a diagram illustrating an example of a pattern of an electrode layer according to an example embodiment.

As illustrated in FIG. 1, the body-attachable triboelectric generating device 100 according to an example embodiment may include a negatively electrified body 110, including an upper electrified layer 111 and a lower electrified layer 112 adhered to the upper electrification layer 111, and an electrode layer 120 provided between the upper electrified layer 111 and the lower electrified layer 112.

An engraved pattern, serving as a spacer, may be formed on one surface of the upper electrified layer 111 and one surface of the lower electrified layer 112 in contact with the electrode layer 120.

Specifically, the negatively electrified body 110 including the upper electrified layer 111 and the lower electrified layer 112 may include an elastomer.

Such an elastomer may include polydimethylsiloxane (PDMS) or silicone rubber.

The above-mentioned electrode layer 120 may include metal composite embroidery yarn.

Such metal composite embroidery yarn may include at least one of gold, silver, copper, and stainless steel.

The electrode layer 120 may be provided between the upper charging layer 111 and the lower charging layer 112 to form a predetermined pattern. The predetermined pattern may be a zigzag pattern, as illustrated in FIG. 1.

Figure 2A:
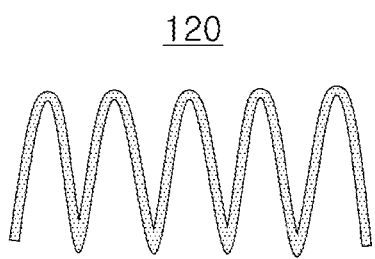
FIG. 2A, FIG. 2B and FIG. 2C are a diagram illustrating an example of a pattern of an electrode layer according to an example embodiment of the present disclosure.

According to another embodiment, the predetermined pattern may be a wrinkle pattern, as illustrated in FIG. 2A.

Figure 2B:
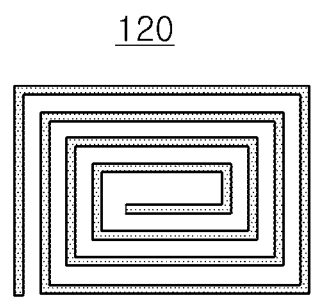
Figure 2C:
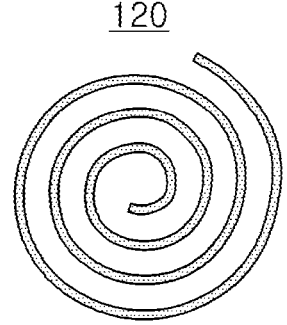

In addition, according to another embodiment, the predetermined pattern may be a rectangular pattern, as illustrated in FIG. 2B, or a spiral pattern, as illustrated in FIG. 2C.

It should be noted that the above-mentioned examples of the predetermined pattern are provided to help the understanding of the present disclosure, and various modified examples may be made based on the needs of those skilled in the art.

The above-described body-attachable triboelectric generating device 100 may generate triboelectricity by contact with the body acting as a positively electrified body.

Hereinafter, the principle of operation of the body-attachable triboelectric generating device 100 according to an example embodiment will be described in detail with reference to FIG. 3.

FIG. 3 is a diagram illustrating the principle of operation of a body-attachable triboelectric generating device according to an example embodiment.

As illustrated in FIG. 3A, when a skin HS is brought into contact with the negatively electrified body 110, triboelectric electrification may occur between two materials and the same amount of charges having opposite polarities may be generated on a surface of each of the skin HS and the negatively electrified body 110.

Then, as illustrated in FIG. 3B, when the skin HS and the negatively electrified body 110 are separated from each other, a potential difference may occur between the two materials and current may flow through an external circuit R due to the potential difference.

Then, as illustrated in FIG. 3D, when the skin HS and the negatively electrified body 110 are separated from each other as far as possible, an electrostatic equilibrium may be formed.

Finally, as illustrated in FIG. 3C, when the skin HS approaches the negatively electrified body 110, an entire process may be reversed and current may be generated in an opposing direction.

FIG. 4 is a diagram illustrating an electrical output generated when force is applied to a body-attachable triboelectric generating device according to an example embodiment of the present disclosure.

Figure 4A:
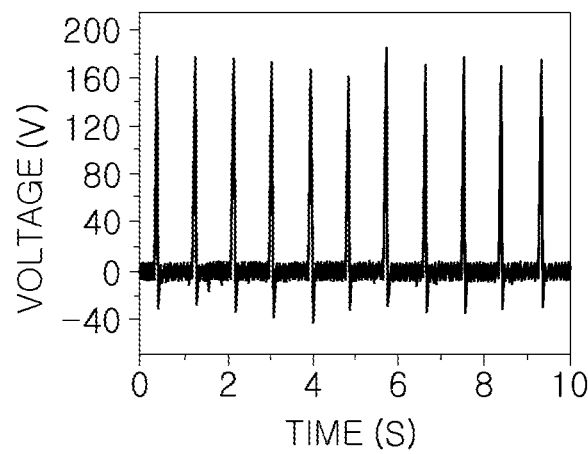
FIG. 4A, FIG. 4B, FIG. 4C and FIG. 4D are a diagram illustrating an electrical output generated when force is applied to a body-attachable triboelectric generating device according to an example embodiment of the present disclosure.
Figure 4B:
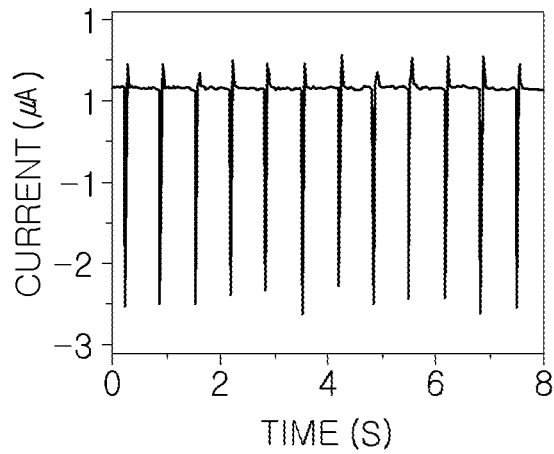

FIGS. 4A and 4B are graphs illustrating a voltage and a current generated when a triboelectric generating device 100 is periodically brought into contact with and separated from a skin HS at about 1 kilogram-force (kgf).

Figure 4C:
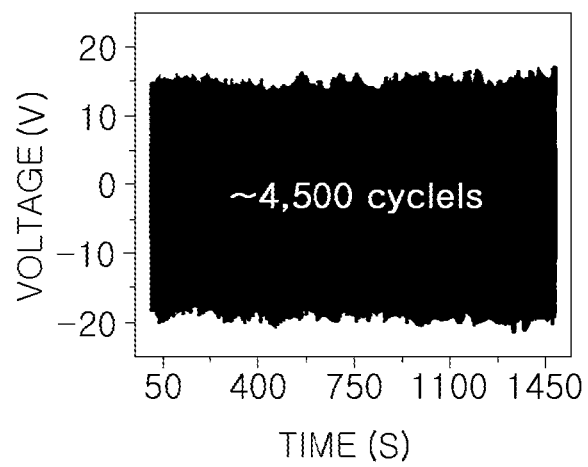
Figure 4D:
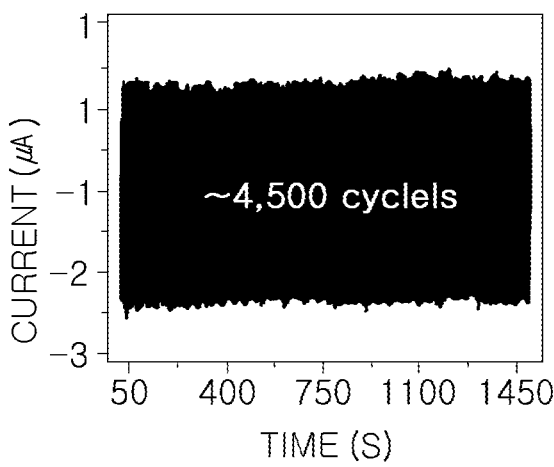

FIGS. 4C and 4D are graphs illustrating an output voltage and a current generated through contact and separation process for 4,500 cycles to investigate stability and durability of the triboelectric generating device 100.

As can be seen in FIG. 4, a body-attachable triboelectric generating device according to an example embodiment may stably output electricity for a long cycle.

FIG. 5 is a diagram illustrating an example of driving an electronic product of a body-attachable triboelectric generating device according to an example embodiment.

FIG. 5 illustrates that an electronic watch 1 may be tapped with a right hand to operate in a state in which the triboelectric generating device 100 is attached to a left hand.

Figure 5C:
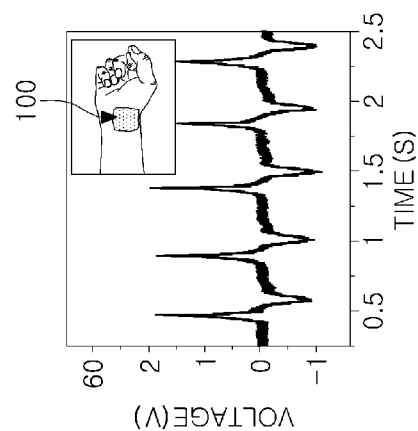
FIG. 5A, FIG. 5B and FIG. 5C are a diagram illustrating an example of driving an electronic product of a body-attachable triboelectric generating device according to an example embodiment of the present disclosure.
Figure 5B:
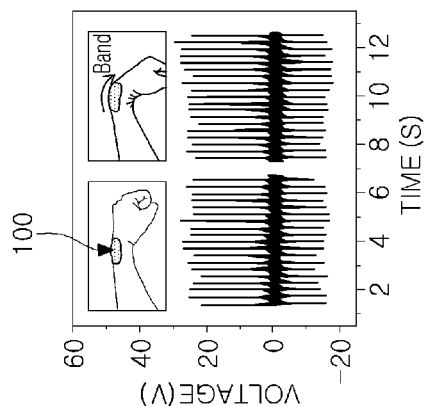
Figure 5A:
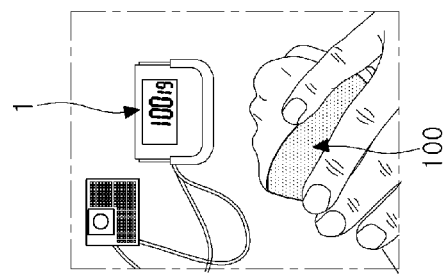

FIG. 5 illustrates an output voltage based on bending of a wrist to which the triboelectric generating device 100 is attached. In this case, similarly to what is illustrated in FIG. 5A, when the triboelectric generating device is tapped with a right hand, higher triboelectricity may be generated.

FIGS. 5A, 5B, and 5C illustrate that the triboelectric generating device 100 is used to detect an artery pulse of the wrist. As can be seen in FIGS. 5A, 5B, and 5C, a voltage is output by the detected artery pulse.

As described above, according to example embodiments, an upper electrified layer, a lower electrified layer, and an electrode layer between the upper charging layer and the lower charging layer may be provided, and an engraved pattern serving as a spacer may be formed on one surface of the upper electrified layer and one surface of the lower electrified layer in contact with the electrode layer. Therefore, an additional spacer may not be required, a triboelectric generating device may be attached to a body to stably harvest energy, and a micropressure such as an artery pulse may be sensed.

In addition, according to example embodiments, an elastomer may be used as an electrified body and an electrode layer may be formed in a predetermined pattern using metal composite embroidery yarn, so that the device may be strained and expanded and contracted. Moreover, the device may be easily attached to a curved portion of a body due to thinness and flexibility of the body, and stable electrical output may be achieved.

Figure 6:
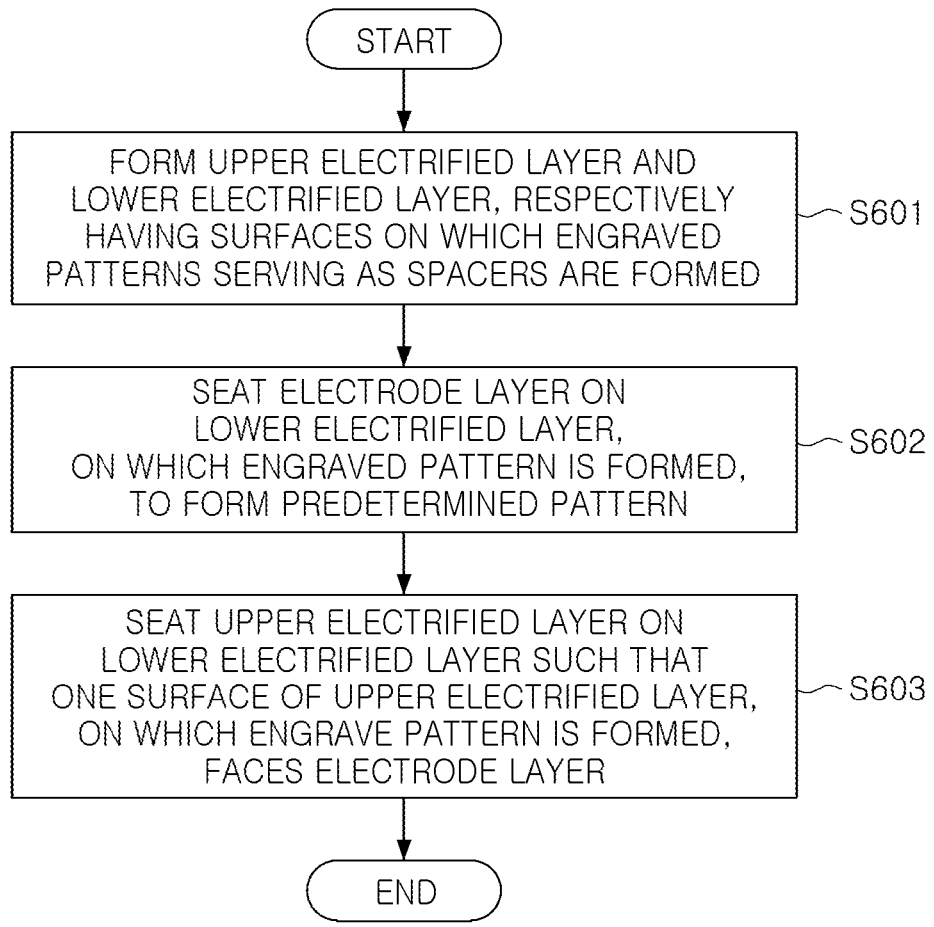
FIG. 6 is a flowchart illustrating a method of manufacturing a body-attachable triboelectric generating device according to an example embodiment of the present disclosure.

FIG. 6 is a flowchart illustrating a method of manufacturing a body-attachable triboelectric generating device according to an example embodiment, and FIG. 7 is a diagram materializing operation 5601 illustrated in FIG. 6.

Referring to FIGS. 1 to 6, a method 5600 of manufacturing a body-attachable triboelectric generating device according to an example embodiment may start with operation 5601 of forming an upper electrified layer 111 and a lower electrified layer 112, respectively having surfaces on which engraved patterns serving as spacers are formed.

Hereinafter, operation 5601 of forming each of the upper electrified layer 111 and the lower electrified layer 112 described above with reference to FIG. 7 will be described in more detail.

As illustrated in FIG. 7, a casting mold 701 may be attached to one surface of a glass substrate 702. An embossed pattern 701a may be formed on an exposed surface of the above-described casting mold 701. Such a casting mold may include a Teflon tape.

Since the above-mentioned Teflon has nonstick characteristics, a cured elastomer may be easily peeled off.

Next, as illustrated in FIG. 7, an elastomeric solution 703 may be applied to the exposed surface of the casting mold 701.

When the elastomeric solution 703 is then cured, as illustrated in FIG. 7, the cured elastomer 110 may be removed from the casting mold 701 to form the upper electrified layer 111 or the lower electrified layer 112 having one surface on which an engraved pattern 110a, corresponding to the embossed pattern 701a, is formed.

Returning to FIG. 6, the electrode layer 120 may be seated on the lower electrified layer 112, on which the engraved pattern is formed, to form a predetermined pattern.

Finally, the upper electrified layer 111 may be adhered to the lower electrified layer 112 such that the surface of the upper charging layer 111, on which the engraved pattern is formed, faces the electrode layer 120. As a result, a triboelectric generating device may be manufactured.

As described above, according to example embodiments, an upper electrified layer, a lower electrified layer, and an electrode layer between the upper charging layer and the lower charging layer may be provided, and an engraved pattern serving as a spacer may be formed on one surface of the upper electrified layer and one surface of the lower electrified layer in contact with the electrode layer. Therefore, an additional spacer may not be required, a triboelectric generating device may be attached to a body to stably harvest energy, and a micropressure such as an artery pulse may be sensed.

In addition, according to example embodiments, an elastomer may be used as an electrified body and an electrode layer may be formed in a predetermined pattern using metal composite embroidery yarn, so that the device may be strained and expanded and contracted. Moreover, the device may be easily attached to a curved portion of a body due to thinness and flexibility of the body, and stable electrical output may be achieved.

While exemplary embodiments have been shown and described above, it will be apparent to those skilled in the art that modifications and variations could be made without departing from the scope of the present disclosure as defined by the appended claims.

What is claimed is:

1. A body-attachable triboelectric generating device comprising:
    a negatively electrified body including an upper electrified layer and a lower electrified layer adhered to the upper electrified layer; and
    an electrode layer provided between the upper electrified layer and the lower electrified layer,
    wherein an engraved pattern, serving as a spacer, is formed on one surface of each of the upper and lower electrified layer in contact with the electrode layer, and
    wherein, the negatively electrified body is formed by adhering a surface, on which the engraved pattern is formed, of the upper electrified layer, to a surface, on which the engraved pattern is formed, of the lower electrified layer.

2. The body-attachable triboelectric generating device of claim 1, wherein the negatively electrified body includes an elastomer.

3. The body-attachable triboelectric generating device of claim 2, wherein the elastomer includes polydimethylsiloxane (PDMS) or silicone rubber.

4. The body-attachable triboelectric generating device of claim 2, which generates triboelectricity by contact with a body acting as a positively electrified body.

5. The body-attachable triboelectric generating device of claim 1, wherein the electrode layer includes metal composite embroidery yarn.

6. The body-attachable triboelectric generating device of claim 5, wherein the metal composite embroidery yarn includes at least one of gold, silver, copper, and stainless steel.

7. The body-attachable triboelectric generating device of claim 5, wherein the electrode layer forms a predetermined pattern.

8. The body-attachable triboelectric generating device of claim 7, wherein the predetermined pattern includes a zigzag pattern or a wrinkle pattern.

* * * * *